March 25, 1930.  G. H. CLARK  1,751,906

HOLLOW CYLINDER OR BUSHING AND METHOD OF RECESSING THE SAME

Filed Dec. 27, 1926

INVENTOR
George H. Clark.
by Macleod, Calver, Copeland & Dike,
Attys

Patented Mar. 25, 1930

1,751,906

UNITED STATES PATENT OFFICE

GEORGE HALL CLARK, OF CINCINNATI, OHIO, ASSIGNOR, BY MESNE ASSIGNMENTS, TO MERRIMAN BROTHERS, INC., OF BOSTON, MASSACHUSETTS, A CORPORATION OF MASSACHUSETTS

HOLLOW CYLINDER OR BUSHING AND METHOD OF RECESSING THE SAME

Application filed December 27, 1926. Serial No. 157,318.

This invention relates to the formation of recesses in the inner surfaces of hollow cylinders, and especially, although not exclusively, to the manufacture of self-lubricating bushings of the type having an interior bearing surface provided with inserts of lubricant material placed sufficiently close together and so arranged as to provide for continuous lubrication over the entire surface. In the preparation of such bushings, it is necessary to form the bearing surface with a series of suitably positioned holes or pockets for the reception of the lubricant inserts. When such surface is at the interior of the bushing, it has heretofore been customary, because of the relative inaccessibility of said surface, either to form the bushing in two parts, resulting in what is known as a split bushing, or, in the case of a solid bushing having a continuous annular wall, to drill the holes entirely through said wall from the exterior thereof. Split bushings are relatively expensive to produce, require great care in assembling, and are entirely unsuitable for some purposes. On the other hand, when pockets or recesses on the inner face only are required, the complete perforation of the wall of a solid bushing at the necessary points is not only a useless waste of labor and material but the cause of an undue weakening of the bushing, which is frequently called upon to withstand considerable crushing stress, particularly when driven into place in the part by which it is carried.

The present invention has, therefore, for its object the production of a solid or unsplit cylinder or bushing having upon its interior surface lubricant receiving holes or pockets of the requisite number, size, and arrangement, but in which the complete perforation of the wall is reduced to a minimum.

The more particular objects of the invention will best be understood from the following detailed description of the preferred mode of carrying the same into effect, as illustrated in the accompanying drawings. It will be understood, however, that the particular constructions and operations described and shown have been chosen for illustrative purposes merely, and that the invention, as defined by the claims hereunto appended, may be otherwise embodied and practised without departure from the spirit and scope thereof.

Figure 1:
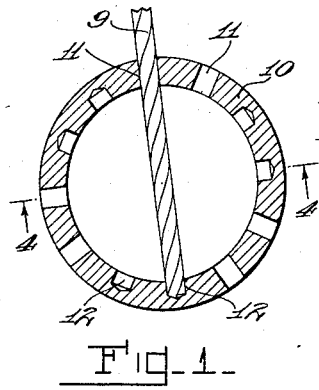
Fig. 1 is a transverse section, taken substantially on the line 1—1, Fig. 3, of a bushing, illustrating the method of drilling the same.
Figure 2:
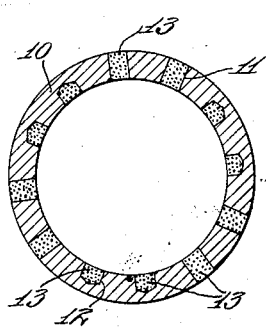
Fig. 2 is a view similar to Fig. 1 of the completed bushing.

In accordance with the present invention, a suitable drill 9 (Fig. 1) is applied to the exterior face of the wall of a solid bushing 10 at a point corresponding to that at which a lubricant-receiving hole is to be formed, and a radially disposed hole or perforation 11 drilled entirely through said wall at this point. Said drill is then advanced to engage the inner face of the wall of the bushing at a point diametrically opposite the hole 11 and the drilling operation continued at said last named point to form a recess 12 extending only part way through said wall. There are thus formed, at a single drilling operation, two lubricant-receiving holes located at diametrically opposite points and only one of which passes entirely through the wall of the bushing. The drill 9 is then withdrawn and the foregoing operations repeated as many times and at such points as may be necessary to produce the required series of holes, which are then filled with lubricant material 13 (Fig. 2) in any suitable way familiar to those skilled in the art.

Figure 3:
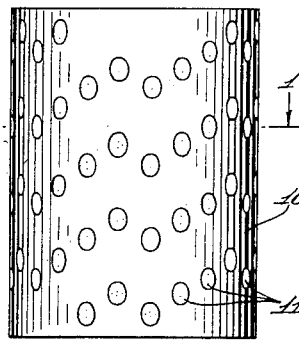
Fig. 3 is a side elevation of the bushing shown in Fig. 1 after the completion of the drilling.
Figure 4:
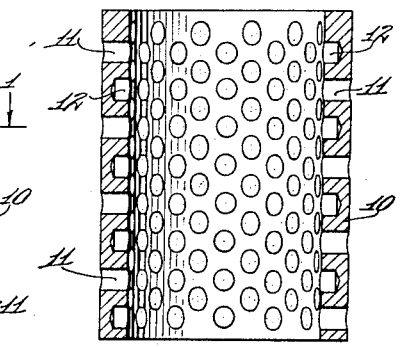
Fig. 4 is a longitudinal section taken substantially on the line 4—4, Fig. 1.
Figure 5:
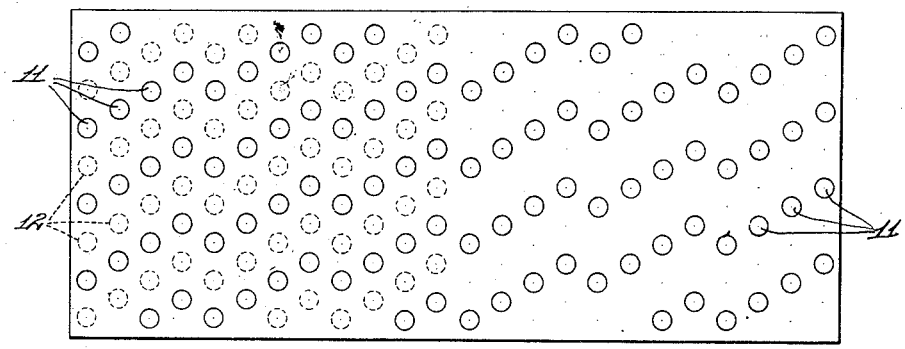
Fig. 5 is a development of the exterior surface of said bushing.
Figure 6:
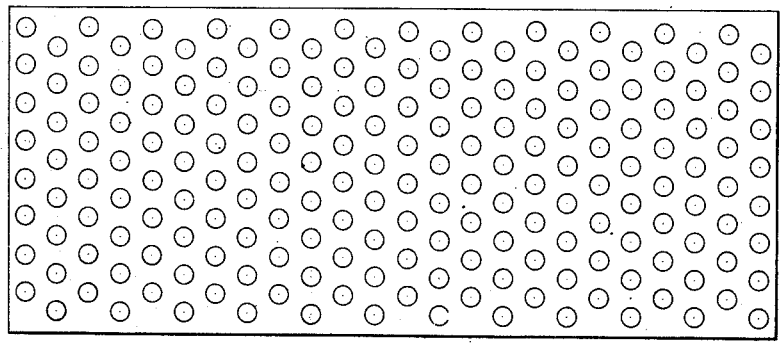
Fig. 6 is a development of the interior surface thereof.

It will be seen that by the method above described a solid bushing or other cylinder may be provided with the required number and arrangement of lubricant-receiving or other holes or pockets only one-half of which pass entirely through the wall of the bushing, thereby greatly reducing the useless waste of labor and material and the extent to which the bushing is weakened by the perforations. In order that the intact material of the bushing may be evenly and efficiently distributed, the drilling is preferably so done that the through perforations 11 and the recesses 12 are alternated with one another. Since each recess 12 is diametrically opposite a perforation 11, it is necessary to arrange said recesses and perforations in groups circumferentially of the cylinder. Moreover, it is usual in self-lubricating bushings, and as shown most clearly in Figs. 4 and 6, to arrange the holes in lines extending longitudinally of the cylinder with the holes in adjacent lines staggered with respect to one another, so as to form other lines of holes extending helically about the cylinder. In accordance with the present invention, the perforations are preferably alternated with the recesses in the longitudinal lines, as shown in Figs. 4 and 5, while in the helical lines the perforations and recesses are preferably arranged in alternating groups, the groups of perforations in each helical line being opposite groups of recesses in the adjacent helical line, as shown in Fig. 5. By this arrangement, and as shown most clearly in Fig. 3, the perforations are so distributed as to avoid undue weakening of the cylinder wall at any point.

Having thus described my invention, I claim:

1. The hereindescribed method of preparing bushings for the reception of lubricant inserts which consists in drilling a hole through the wall of the bushing from the exterior thereof and forming a recess in the inner face of said wall by means of a tool passed through said hole.

2. The hereindescribed method of drilling bushings for the reception of lubricant inserts which consists in drilling a hole entirely through the wall of the bushing from the exterior thereof, advancing the drill to engage the inner face of said wall at a point diametrically opposite said hole, and continuing the drilling operation at said diametrically opposite point to form a recess extending only part way through said wall.

3. The hereindescribed method of forming holes in bushings for the reception of lubricant inserts which consists in drilling one-half of the holes entirely through the wall of the bushing from the exterior thereof and drilling the remaining holes only part way through said wall from the interior thereof by means of a drill passed through said first-named holes.

4. The hereindescribed method of forming holes in bushings for the reception of lubricant inserts which consists in drilling one-half of the holes entirely through the wall of the bushing from the exterior thereof and drilling the remaining holes only part way through said wall and at points diametrically opposite said first-named holes by means of a drill passed through the latter.

5. The hereindescribed method of forming holes in bushings for the reception of lubricant inserts which consists in drilling one-half of the holes entirely through the wall of the bushing from the exterior thereof and drilling the remaining holes only part way through said wall and at points diametrically opposite said first-named holes by a continuation of the same drilling operations.

6. The hereindescribed method of forming recesses in the inner surface of a hollow cylinder which includes drilling a hole through the wall of the cylinder from the exterior thereof and forming a recess in the inner surface of said wall at a point diametrically opposite said hole by means of a tool passed through the latter.

7. A hollow cylinder having a continuous annular wall provided with a series of holes some of which pass entirely through said wall and the remainder of which comprise recesses in the inner face of said wall, extending only part way through the latter, and disposed diametrically opposite said first named holes.

8. A solid self-lubricating bushing having a wall provided with a series of cylindrical holes and lubricant inserts located in said holes, some of said holes passing entirely through said wall, and the remainder of said holes comprising recesses in the inner face of said wall diametrically opposite said first named holes and extending only part way through the latter.

9. A solid self-lubricating bushing having a wall provided with a series of holes and lubricant inserts located in said holes, one-half of said holes passing entirely through said wall, and the remainder of said holes comprising recesses in the inner face of said wall and extending only part way through the latter.

10. A solid self-lubricating bushing having a wall provided with a series of holes and lubricant inserts located in said holes, some of said holes passing entirely through said wall, and the remainder of said holes comprising recesses in the inner face of said wall and extending only part way through the latter, said recesses being located respectively at points diametrically opposite said first-named holes.

11. A solid self-lubricating bushing having a wall provided with a series of holes and lubricant inserts located in said holes, some of said holes passing entirely through said wall, and the remainder of said holes comprising recesses in the inner face of said wall and extending only part way through the latter, said recesses alternating with said first-named holes in the series.

12. A hollow cylinder having a continuous annular wall provided with holes some of which comprise perforations extending entirely through said wall and the remainder of which comprise recesses in the inner face of said wall and extending only part way through the latter, said holes being arranged in lines extending longitudinally of the cylinder, and said perforations alternating with said recesses in said lines.

13. A hollow cylinder having a continuous annular wall provided with holes some of which comprise perforations extending entirely through said wall and the remainder of which comprise recesses in the inner face of said wall and extending only part way through the latter, said holes being arranged in lines extending longitudinally of the cylinder and being staggered in adjacent lines so as to form other lines extending helically about said cylinder, the perforations and recesses being arranged in alternating groups in said helical lines, the groups of perforations in each helical line being opposite groups of recesses in the adjacent helical lines.

14. The method of making self-lubricating bushings which comprises forming holes through the wall of the bushing and recesses in the inner face of said wall diametrically opposite said holes, and filling said holes and recesses with lubricant.

15. The method of making self-lubricating bushings which comprises forming holes through the wall of the bushing by a tool adapted to pierce the same, forming recesses in the inner face of said wall by a tool passed through said holes, and filling said holes and recesses with lubricant.

16. The method of making self-lubricating bushings which comprises drilling a hole through the wall of the bushing from the exterior thereof, forming a recess in the inner face of said wall by a tool passed through said hole, and filling said holes and recesses with lubricant.

17. A self-lubricating bushing having a solid, continuous annular wall provided with a series of holes some of which pass entirely through said wall and the remainder of which comprise recesses in the inner face of said wall, extending only part way through the latter, and disposed diametrically opposite said first named holes, and lubricant inserts in said holes.

18. A self-lubricating bushing having a solid continuous annular wall provided with holes some of which comprise perforations extending entirely through said wall and the remainder of which comprise recesses in the inner face of said wall and extending only part way through the latter, said holes being arranged in lines extending longitudinally of the cylinder, and said perforations alternating with said recesses in said lines, and lubricant inserts in said perforations and recesses.

In testimony whereof I affix my signature.

GEORGE HALL CLARK.